No. 636,681. Patented Nov. 7, 1899.
J. MORRISON.
WATER FEED APPARATUS.
(Application filed July 19, 1899.)
(No Model.)
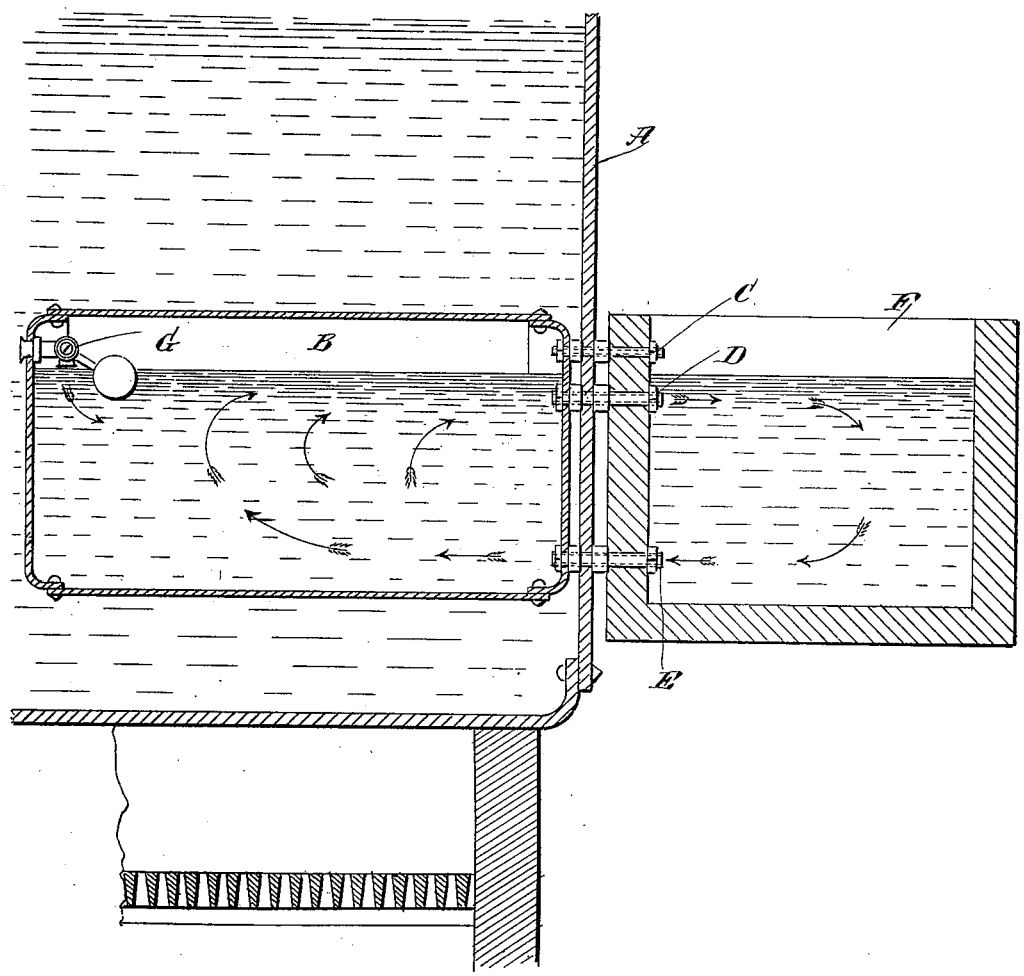
WITNESSES:
H. Walker
Isaac B. Owens
INVENTOR
John Morrison
BY
Munn & Co
ATTORNEYS

UNITED STATES PATENT OFFICE.

JOHN MORRISON, OF DUBUQUE, IOWA.

WATER-FEED APPARATUS.

SPECIFICATION forming part of Letters Patent No. 636,681, dated November 7, 1899.

Application filed July 19, 1899. Serial No. 724,397. (No model.)

*To all whom it may concern:*

Be it known that I, JOHN MORRISON, of Dubuque, in the county of Dubuque and State of Iowa, have invented a new and Improved Water-Feed Apparatus, of which the following is a full, clear, and exact description.

This invention relates to a water-feed apparatus designed especially for watering stock, the essentiality of the invention being a certain novel arrangement of the parts by which the water for the stock is kept heated in readiness to be drunk at all times.

This specification is the disclosure of one form of my invention, while the claims define the actual scope thereof.

Reference is to be had to the accompanying drawing, forming a part of this specification, in which the figure represents a vertical section of the invention.

As here shown, the water-feed apparatus has a main container or reservoir A, which is adapted to be heated by the means shown or by any other, as desired, so that the water contained therein will be kept continually at the proper heated temperature. This container may be heated by any desired means, which I have not shown. Within the container or reservoir A is situated a circulating-chamber B, which is attached to one of the vertical walls of the container A by three hollow stay-bolts C, D, and E. These stay-bolts C, D, and E also serve to attach to the exterior of the container A a delivery-receptacle or drinking-trough F, which is open at its upper side. The stay-bolts also serve to place the chamber B and delivery-receptacle F in communication with each other. The stay-bolt E is located in proximity to the bottoms of the chamber B and receptacle F, and the stay-bolt D is placed above the stay-bolt E, near the top of the chamber and receptacle, but below or in the normal water-line thereof, while the stay-bolt C is located in close proximity with the top of the chamber B, above the hollow stay-bolt D. The chamber B has communication with the container A by an orifice at the upper portion thereof, such orifice being commanded by an automatic float-valve G of any desired construction, the float-valve being arranged so that water is automatically admitted into the chamber B from the container A when the water in the chamber B falls to a level at or immediately below the level shown in the drawing. The container A being heated, the heat is transmitted to the water in the chamber B, and this heated water is thus caused to circulate from the chamber B to the receptacle F and back to the chamber B, the hollow stay-bolt D serving to conduct the hot water from the chamber B to the receptacle F and the hollow stay-bolt E serving to conduct the cold water from the bottom of the receptacle F to the bottom of the chamber B, the hollow stay-bolt C serving all the time to maintain atmospheric pressure within the chamber B. When the water is withdrawn from the receptacle or trough F, the level of the water in the chamber B is lowered, and when the water falls below the predetermined normal level the valve G acts to replenish the supply of water in the chamber B. It will thus be seen that I continually maintain in the receptacle or trough F an ample supply of warm water. This adapts the invention particularly for use in stock-watering apparatus, it being known that the best results are obtained by furnishing the stock with warm or hot water in the wintertime. This invention also serves to prevent the freezing of the water in the trough. The circulation which I have caused to be established between the chamber B and the receptacle F insures the maintenance of the high temperature of the water in the receptacle or trough even though no water be withdrawn from the receptacle for a long time, the receptacle being meanwhile exposed to the cold outer air.

Having thus described my invention, I claim as new and desire to secure by Letters Patent—

1. A water-feed apparatus, having a primary container or reservoir adapted to be heated, a chamber situated within the container or reservoir and supplied with heated water therefrom, and a delivery-receptacle situated exteriorly of the container or reservoir, the said chamber and the delivery-receptacle having a circulating communication with each other.

2. A water-feed apparatus having a primary container or reservoir adapted to be heated, a chamber situated within the container or reservoir, a valve commanding a communication between the container and chamber, the valve serving automatically to maintain the water in the container at a normal elevation, and a delivery-receptacle exterior of the container, the said chamber and the delivery-receptacle having a circulating communication with each other.

3. A water-feed apparatus, comprising a primary container or receptacle, a chamber situated within the same, an automatic valve commanding a communication between the chamber at a predetermined elevation, two hollow stay-bolts situated one above the other and below the said predetermined water elevation in the chamber, the stay-bolts establishing communication between the chamber and the delivery-receptacle to permit the circulation of water between the two, and a third hollow stay-bolt extending between the chamber and the delivery-receptacle above the water-level to form a vent for the chamber.

JOHN MORRISON.

Witnesses:
 ISAAC B. OWENS,
 F. W. HANAFORD.